United States Patent [19]

Hettinga

[11] Patent Number: 5,110,532
[45] Date of Patent: May 5, 1992

[54] METHOD FOR MOLDING A LAMINATE

[76] Inventor: Siebolt Hettinga, 2123 NW. 111th St., Des Moines, Iowa 50322

[21] Appl. No.: 665,571

[22] Filed: Mar. 4, 1991

[51] Int. Cl.$^5$ .................. B29C 45/14; B29C 45/16
[52] U.S. Cl. ............................ 264/257; 264/275; 264/339
[58] Field of Search ............ 264/339, 257, 258, 275, 264/276, 277, 278, 279, 261

[56] References Cited

U.S. PATENT DOCUMENTS

| 4,206,570 | 6/1980 | Cooper | 215/100.5 |
| 4,499,131 | 2/1985 | Knox | 428/267 |
| 4,829,644 | 5/1989 | Kondo et al. | 264/257 |

Primary Examiner—Jay H. Woo
Assistant Examiner—Jeremiah F. Durkin, II
Attorney, Agent, or Firm—Brian J. Laurenzo; Kent A. Herink

[57] ABSTRACT

An improved method for manufacturing a laminate wherein the edges of a deformable surface layer, such as cloth or carpet, are folded under and releasably secured to the undersurface of the deformable surface layer. The deformable surface layer is then placed into a mold unit and the securement between the folded edge and the undersurface of the deformable surface layer is released either prior to or during the injection of a plastic material for forming a plastic support layer. The method produces a laminate including a deformable surface layer having edges which are folded under and totally bonded to the plastic support layer. The bonded edges improve the securement between the deformable surface layer and the plastic support layer and give the laminate a "finished" appearance without tacks or staples.

4 Claims, 2 Drawing Sheets

5,110,532

METHOD FOR MOLDING A LAMINATE

BACKGROUND OF THE INVENTION

The present invention relates generally to the manufacture of a laminate and, more particularly, to a laminate wherein the edges of a deformable surface layer are folded under and molded in a total bonded relationship to the edges of a plastic support layer during the injection of the plastic material.

In the past, in the manufacture of laminates having a deformable surface layer such as cloth or carpet and a plastic support layer, the cloth or carpet was stretched over the plastic support layer and the edges of the cloth or carpet were folded and tacked or stapled to the bottom of the plastic support layer.

A total bonded relationship can be achieved by placing the deformable surface layer into the mold unit and injecting a plastic material to form a plastic support layer which is molded in a total bonded relationship with the deformable surface layer. However, a problem with this method of molding the plastic support layer to the deformable surface layer is that the edges of the deformable surface layer do not bond to the bottom of the plastic support layer because it has not been possible to pre-fold them accordingly so as to bond to the bottom of the injected plastic material.

The difficulties in this prior art method of manufacturing laminates are substantially eliminated by the present invention.

SUMMARY OF THE INVENTION

Accordingly, it is an object of the present invention to provide a method for manufacturing a laminate in which the edges of a deformable surface layer are molded in a total bonded relationship to the bottom of a plastic support layer during injection of the plastic material.

By the present invention, it is proposed to overcome the difficulties encountered heretofore. To this end, it has been discovered that pre-folding the deformable surface layer by folding under the edge portion along at least a partial perimeter of the deformable surface layer and releasably securing the folded edge portion to the undersurface of the deformable surface layer prior to placing the deformable surface layer into the mold unit, closing the mold unit, and allowing the securement between the folded edge portion and the undersurface of the deformable surface layer to release, results in the folded edges being positioned such that, upon injecting of a plastic material into the mold unit, a laminate is produced having a deformable surface layer with edges which are totally bonded to the edges and bottom of a plastic support layer. Alternatively, the securement between the folded edge portion and the undersurface of the deformable surface layer may be released upon injection of the plastic. The bonded edges improve the securement between the deformable surface layer and the plastic support layer while giving the laminate a "finished" appearance without tacks or staples.

DETAILED DESCRIPTION OF THE INVENTION

Figure 5:
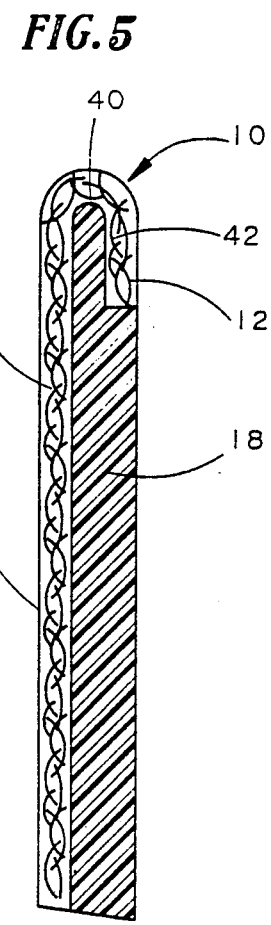
FIG. 5 is a sectional side elevation view of the laminate of FIG. 4, specifically showing a finished edge.
Figure 6:
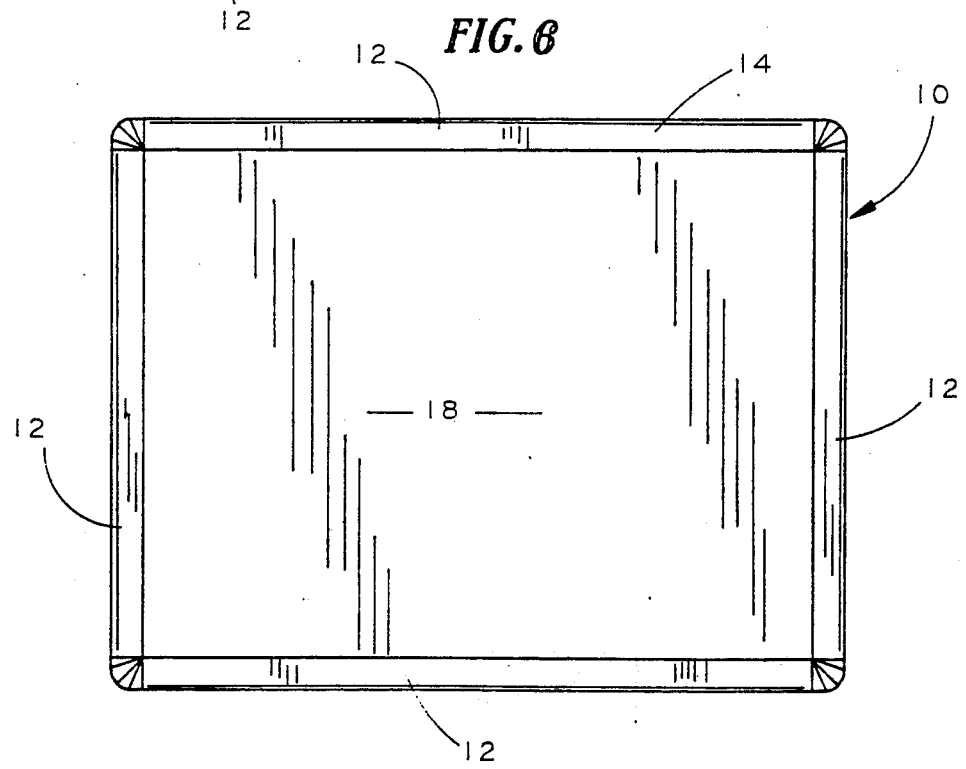
FIG. 6 is a bottom plan view of the finished laminate shown in FIG. 5.

In the Figures, a process of forming a laminate 10 (FIGS. 5 and 6) is illustrated wherein edges 12 of a deformable surface layer 14 are folded over and releasably secured (FIG. 1) prior to the deformable surface layer 14 being placed into a mold unit 16 in which a plastic is injected to form a support layer 18 for the laminate 10. The process is suitable for materials such as cloth, carpet, film, foil, paper or any other material which is deformable and below which it is desirable to form a plastic support layer 18. It is to be understood that the terms "bottom", "top", "above", "below", "over" and "under" are relative to the laminate as it would be seen in normal use.

Figure 1:
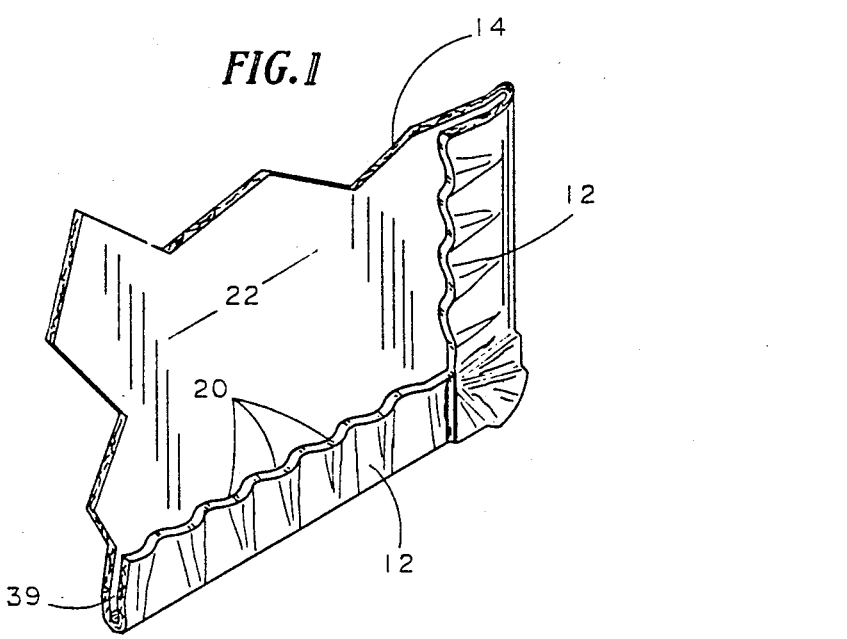
FIG. 1 is a partial perspective view of a deformable layer of material which has been pre-folded in accordance with the method of this invention.

In the forming of the laminate 10, the deformable surface layer 14 is provided in which the edge portion 12 located along at least a partial perimeter of the deformable surface layer 14 is folded under (FIG. 1). In order to keep the edge portion 12 of the deformable surface layer 14 uniformly folded under, along the perimeter of the deformable surface layer 14, long enough to place the deformable surface layer 14 into a mold unit 16 and to close the mold unit 16, a releasable adhesive is placed at intermittent points 20 along the perimeter of the deformable surface layer 14 between the folded edge portion 12 and an undersurface 22 of the deformable surface layer 14. The folded edge portion 12 is then pressed against the undersurface 22 of the deformable surface layer 14 into adhesive contact It is preferred that the adhesive be of the type which is releasable after time.

Figure 2:
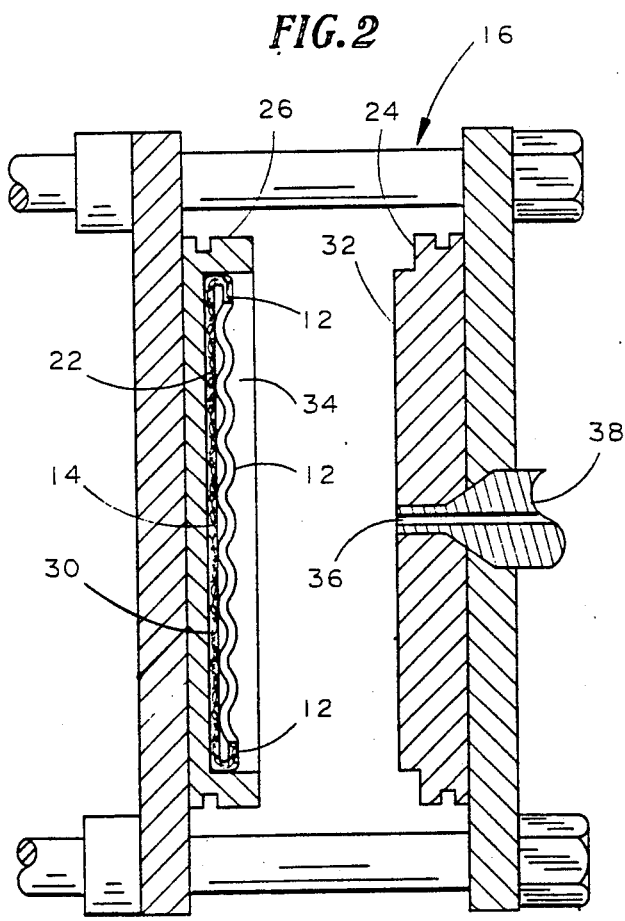
FIG. 2 is a sectional elevation of a mold unit for forming a plastic support layer to be integrated with the deformable layer of material shown in FIG. 1, with the mold unit shown in the open position therefor.
Figure 3:
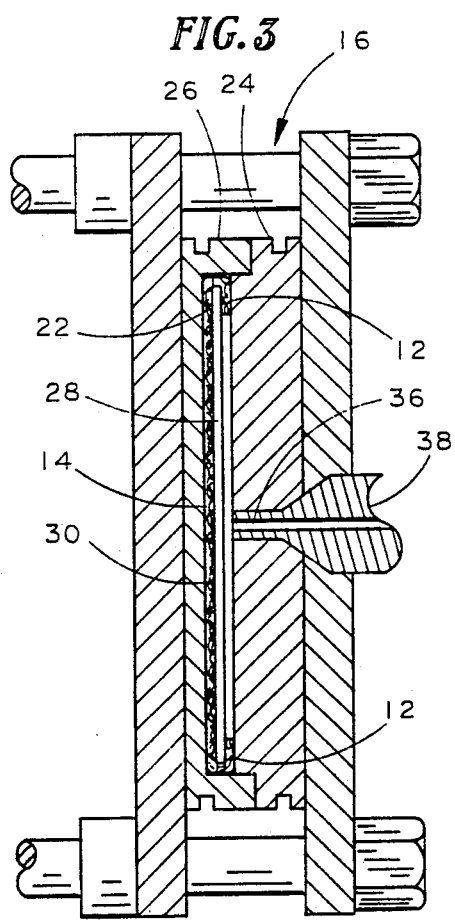
FIG. 3 is illustrated similarly to FIG. 2 and shows the mold unit in a closed position therefor.
Figure 4:
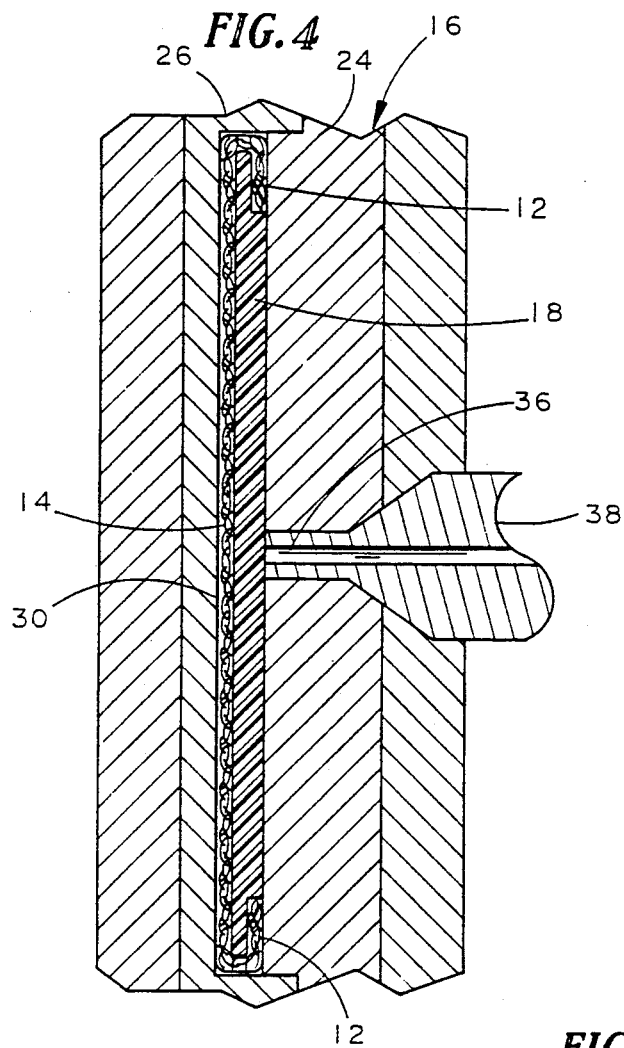
FIG. 4 shows the closed mold unit shown in FIG. 3 after a plastic has been injected into the closed mold thus forming a laminate.

In the molding of the plastic support layer 18 for the laminate 10, there is provided the plastic injection mold unit 16 (FIGS. 2-4) having a stationary male mold portion 24 and a movable female mold portion 26 which, when the mold unit 16 is in its closed position (FIGS. 3 and 4), form a mold cavity 28 for the plastic support layer 18 of the laminate 10. With the mold portions 24 and 26 in their open positions (FIG. 2), the deformable surface layer 14 having its edge portions 12 folded under and secured to its undersurface 22, is placed within the mold unit 16 and proximate a flat surface 30 of the female mold portion 26. When the deformable surface layer 14 is in place in the mold unit 16, the undersurface 22 of the deformable surface layer 14 is directed towards the male mold portion 24.

The female mold portion 26 is moved toward the male mold portion 24 and clamped into a closed position (FIGS. 3 and 4) wherein a projecting member 32 of the male mold portion 24 is received within a coacting recess 34 formed in the female mold portion 26 thereby creating the mold cavity 28. A plastic material is then injected into the mold cavity 28 through a gate opening 36 from an injection nozzle 38 to fill the mold cavity 28 and the space between the folded edge portion 12 of the deformable surface layer 14 and the undersurface 22 of the deformable surface layer 14. After the male mold portion 24 and the female mold portion 26 have been clamped together, but prior to injection of the plastic material, it is preferred that the adhesive securement between the edge portion 12 of the deformable surface layer 14 and the undersurface 22 of the deformable surface layer 14 release, thus forming the proper space between the edge portion 12 and the undersurface 22 for the plastic to fill therebetween. Alternatively, if the securement between the folded edge portion 12 and the undersurface 22 of the deformable surface layer 14 has not released, the injected plastic material enters the tunnel-like space 39 (FIG. 1) therebetween and breaks the securement between the edge portion 12 and the undersurface 22 of the deformable surface layer 14 while concurrently filling the space therebetween.

The female mold portion 26 is then moved away from the male mold portion 24 and the resultant laminate 10, having a deformable surface layer 14 and a plastic support layer 18 integrated in a total bonded relationship therewith, is removed.

As described hereinabove, the edge portions 12 of the deformable surface layer 14 are now uniformly folded under and secured to the edge 40 and the bottom 42 of the plastic support layer 18 (FIG. 5) in order to provide a finished edge which provides for improved securement between the deformable surface layer 14 and the plastic support layer 18 and while giving the laminate 10 a "finished" appearance without tacks or staples.

While an acrylonitrile-butadiene-styrene plastic is preferred as the plastic support layer 18 of the laminate 10, other suitable materials may be used such as styrene and polypropylene plastics. Likewise, while a tacky glue is preferred as the releasable adhesive material between the edge portion 12 of the deformable surface layer 14 and the undersurface 22 of the deformable surface layer 14, other forms of releasable securement may be used, which either release after a time prior to or upon the injection of the plastic material.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while a single deformable surface layer 14 and plastic support layer 18 are shown in the laminate 10, any number of layers greater than two are also contemplated.

I claim:

1. A process of injection molding for forming a laminate having a deformable surface layer and a thermoplastic substrate, as the bonding agent, said process comprising the steps of:
   (a) providing a male mold member and a female mold member;
   (b) folding under an edge portion along at least a partial perimeter of said deformable surface layer;
   (c) releasably securing said folded edge portion of said deformable surface layer to the undersurface of said deformable surface layer;
   (d) placing said deformable surface layer between said male mold member and said female mold member, said undersurface of said deformable surface layer directed toward said male mold member;
   (e) clamping said male mold member and said female mold member together to form a mold cavity;
   (f) allowing time for said securement between said folded edge portion and said undersurface of said deformable surface to release;
   (g) injecting a plastic material into the mold cavity and between said folded perimeter edge portion of said deformable surface layer and said undersurface of said deformable surface layer;
   (h) allowing said plastic material to at least partially cool and harden; and then
   (i) removing the resultant laminate from the mold cavity.

2. The process, according to claim 1, further comprising the steps of:
   (a) placing an adhesive at intermittent points between said perimeter edge portion of said deformable surface layer and said undersurface of said deformable surface layer; and then to secure releasably
   (b) applying pressure the points of adhesive contact between said folded edge portion of said deformable surface layer and said undersurface of said deformable surface layer.

3. A process of injection molding for forming a laminate having a fabric surface layer upon a plastic support layer, said process comprising the steps of:
   (a) providing a male mold member and a female mold member;
   (b) folding under an edge portion along at least a partial perimeter of a main portion of said fabric surface layer;
   (c) releasably attaching said edge portion to an undersurface of said main portion of said fabric surface layer;
   (d) placing said fabric surface layer between said male mold member and said female mold member, said undersurface of said main portion of said fabric surface layer directed toward said male mold member;
   (e) clamping said male mold member and said female mold member together to form a mold cavity;
   (f) injecting a plastic material into the mold cavity thus breaking the attachment between said edge portion and said main portion of said fabric surface layer while concurrently filling said edge portion with said plastic;
   (g) allowing said plastic material to at least partially cool and harden; and then
   (h) removing the resultant laminate from the mold cavity.

4. The process, according to claim 3, further comprising the steps of:
   (a) placing an adhesive at spaced intervals between said edge portion and said undersurface of said main portion of said fabric surface layer;
   (b) applying pressure to secure releasably the points of adhesive contact between said edge portion and said undersurface of said main portion thus forming a tunnel between said edge portion and said undersurface of said main portion of said fabric surface layer; and then
   (c) breaking said points of adhesive contact by injecting said plastic into said tunnel between said edge portion and said undersurface of said main portion of said fabric surface layer.

* * * * *

UNITED STATES PATENT AND TRADEMARK OFFICE
CERTIFICATE OF CORRECTION

PATENT NO. : 5,110,532

DATED : May 5, 1992

INVENTOR(S) : Siebolt Hettinga

It is certified that error appears in the above-identified patent and that said Letters Patent is hereby corrected as shown below:

Column 4, Line 21, should read --able surface layer; and then--; Line 22 should read --applying pressure to secure releasably the points of adhesive contact--.

Signed and Sealed this

Twenty-first Day of September, 1993

*Attest:*

BRUCE LEHMAN

*Attesting Officer*     *Commissioner of Patents and Trademarks*